M. J. DIKEMAN.
MECHANICAL DEVICE FOR TURNING AUTOMOBILES.
APPLICATION FILED MAR. 3, 1919.

1,320,745.

Patented Nov. 4, 1919.
2 SHEETS—SHEET 1.

WITNESSES:

INVENTOR
Myron J. Dikeman
By Charles E. Wiens
Atty

M. J. DIKEMAN.
MECHANICAL DEVICE FOR TURNING AUTOMOBILES.
APPLICATION FILED MAR. 3, 1919.

1,320,745.

Patented Nov. 4, 1919.
2 SHEETS—SHEET 2.

WITNESSES:

INVENTOR
Myron J. Dikeman
By Charles E. Wiscer
Atty.

UNITED STATES PATENT OFFICE.

MYRON J. DIKEMAN, OF DETROIT, MICHIGAN.

MECHANICAL DEVICE FOR TURNING AUTOMOBILES.

1,320,745.  Specification of Letters Patent.  Patented Nov. 4, 1919.

Application filed March 3, 1919. Serial No. 280,411.

*To all whom it may concern:*

Be it known that I, MYRON J. DIKEMAN, a citizen of the United States, residing at Detroit, county of Wayne, State of Michigan, have invented a certain new and useful Improvement in Mechanical Devices for Turning Automobiles, and declare the following to be a full, clear, and exact description of the same, such as will enable others skilled in the art to which it pertains to make and use the same, reference being had to the accompanying drawings, which form a part of this specification.

The objects of my invention are, first, to provide a means whereby the driver of an automobile can remove his car, quickly and easily, from a line of closely packed cars, or can turn the car on the space in which it stands, part or all the way around; and can remove the car without danger of collision with the car in front or rear, which is apt to occur by the present means now used, or damage to the tires caused by twisting the wheels back and forth while zig-zagging the car from the line.

This is accomplished by a device which moves the front end of the automobile sidewise away from the curb of the street and without any longitudinal movement of the automobile.

The invention consists of an automatic jack and wheel clamped to the front axle of the automobile and driven directly from the motor, which first raises the front end of the automobile from the ground, then carrying it sidewise on the supporting wheel to the desired position and lowering the car to the ground again automatically. At all times, the device is under the complete and full control of the driver.

It is a further object of the invention to secure a device that is simple in construction, effective in operation and easily and conveniently controlled, and these several objects are secured in the preferred form by the construction and arrangement of parts as hereinafter more fully described.

Similar parts are marked by similar numerals in all drawings.

I will now describe more fully the working parts of the device, referring to the accompanying drawings and marks thereon.

The entire device is clamped to the front axle of the automobile, 1 by dividing the main casting on the line indicated —M. The main shaft —2— passes through the entire frame and carries two loosely mounted bevel gears, —3— and —4—, which are both continuously meshed into bevel gear —5. Bevel gear —5— is keyed to shaft 6, which in turn is keyed to spur gear —7. Gear —7— meshes with gear —8—. Gear —8—, and worm —9— are both keyed to shaft —10—. Worm —9— meshes into rack —11. Rack —11— is fastened to the main slide —12— supporting the carrying wheel —19—, and raises and lowers the automobile. The carrying wheel may be set at right angles to the axis of the automobile, or at any angle with the axis, as to pivot the automobile about one of the rear wheels.

Gear —15— is keyed to the main shaft —2, and is connected by either (spur or friction) gear —16— to the crank shaft gear —17. Gear —17— is keyed to the crank shaft and runs continuously with the engine. Gear —16— may be brought in contact with gear —17— by means of lever —18—, which carries an eccentric upon which gear 16 rotates, and thus giving both power and motion to the main shaft —2.

Main shaft —2 also carries a loose collar —13—, with ratchet teeth on both ends, splined to and rotates continuously with said shaft. A movement of the ratchet collar —13—, either forward or backward, will engage the ratchet teeth in the corresponding ratchet teeth on either the bevel gear —3— or —4, thus giving gear —5— either a forward or backward motion. Collar —13— is controlled by rocker —14, which is notched over the sides of, and engages in the grooves around said collar, and also carries an arm extending from the side, thus having constant control, and allowing a continuous rotation of said collar. Rocker —14— is keyed on shaft —30— passing through the casing.

By raising arm on the side of rocker —14, the ratchet collar 13— is engaged with the bevel gear —4, which then rotates directly with the main shaft —2—, giving gears —5— and —7 a backward rotation, and gears —8— and —9— a forward rotation, thus lowering the main slide —12— with carrying wheel —19, and raising the front end of the automobile clear from the ground. A projecting pin —20— at the upper end of slide —12, engages the lever arm 14— and disconnecting the ratchet collar —13— from gear —4—, prevents further raising of the automobile.

Slide —12— carries at the top a spur gear —21, keyed to shaft —22. The bevel gear —23— is also keyed to shaft —22, and meshes with bevel gear —24. Gear —24— is keyed to drive shaft 25. Gear —26— is keyed to drive shaft —25—, also meshes with gear —27. Gear 27 is fastened to, and rotates the carrying wheel —19.

Figure 1:
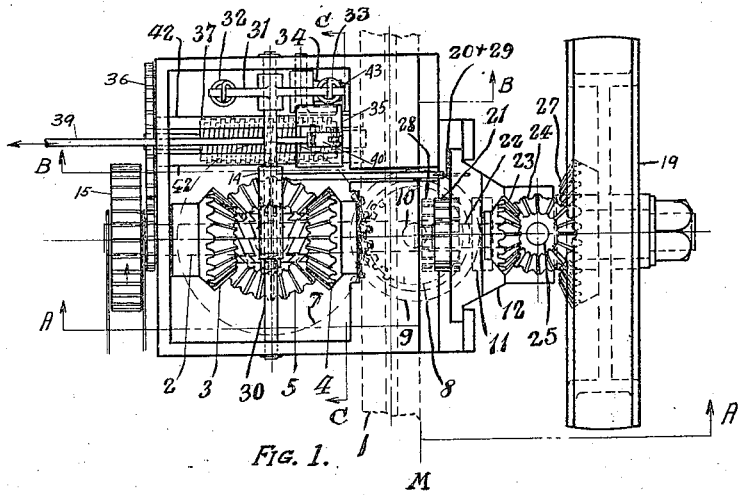
Figure 1 is a plan view of the device, showing the general arrangement of the drive gears and the timing apparatus.
Figure 2:
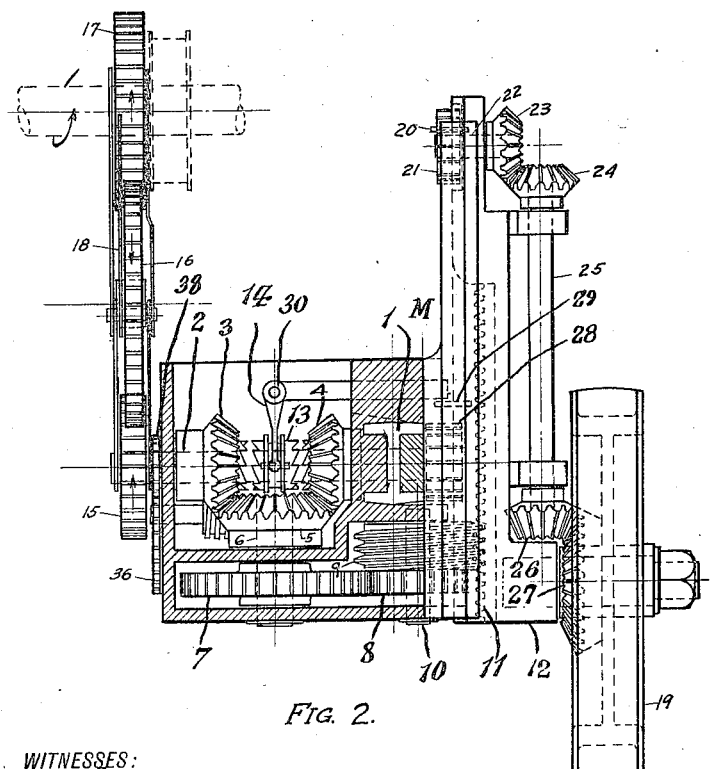
Fig. 2 is a sectional view on line A A, showing the main drive gears which raise and lower the jack, and operating the carrying wheel, also trip mechanism for operating same.

By the time the pin —20—, on the top end of slide —12, engages the rocker arm —14, disconnecting the ratchet collar 13— from —4—, the gear —21— is then meshed with gear 28—. Gear 28— being keyed to the main shaft —2, causes the rotation of gears —21—23—24—26, turning the carrying wheel —19, moving the front end of the automobile out, and will continue to rotate until the timing apparatus trips the rocker —31—, thus rotating rocker —14— and engaging ratchet collar —13— in gear —3, which reverses the gear —5 and raises the main slide —12—, also disengaging gears —21— and —28. When the slide —12— is raised to the position as shown in Fig. 2, the pin —29— engages the rocker arm —14, disconnecting the ratchet collar —13— from gear —3—, thus stopping the movement of the slide, which remains in this position until a new operation.

Figure 3:
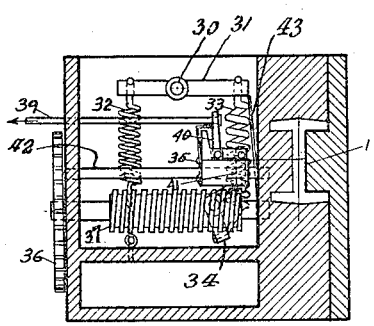
Fig. 3 is a sectional view B B, showing the timer which controls the trip, and the distance the automobile is turned.
Figure 4:
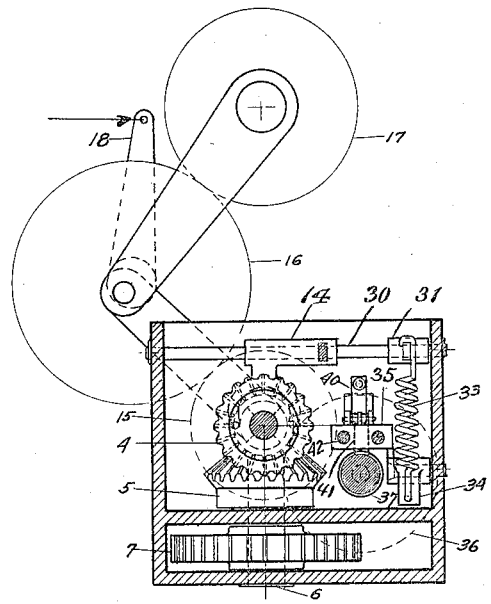
Fig. 4 is a sectional view C C, showing the relative position of the drive gears and timing apparatus, as well as the main drive (gears or friction wheels), which connect the main shaft directly with the motor of the automobile, and by which the device is operated.
Figure 5:
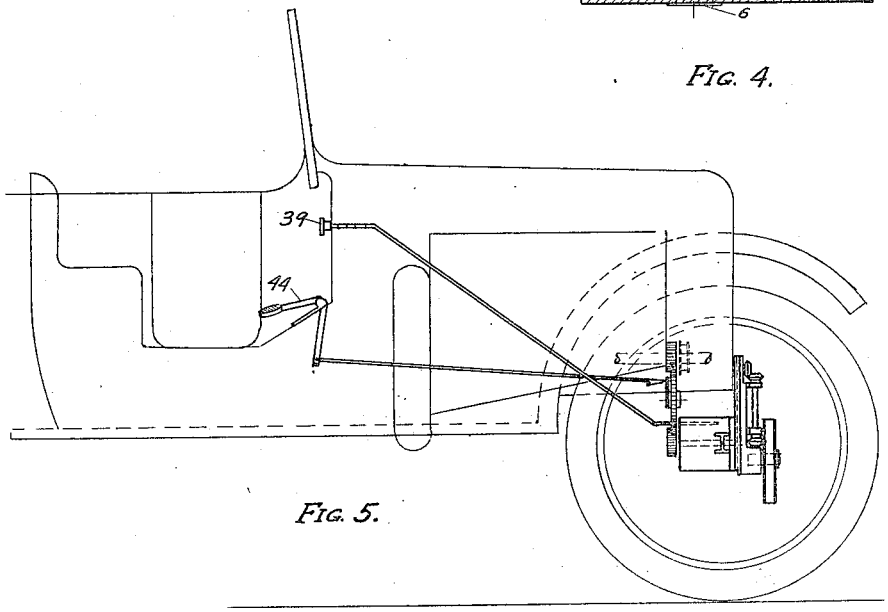
Fig. 5 shows the general arrangement by which the device is attached to the automobile, and the method and means by which it is operated and controlled by the driver of the car.

In Figs. 3 and 4, rocker —31— is keyed to shaft —30— and is controlled by a light coil spring —32 at one end, and a heavy coil spring —33— at the other end, as shown. Spring —32— is connected to the bottom of the casing, and is always under tension. Spring —33— is attached to rocker —34—, and is in tension only when the slide —35— is in the extreme position, as shown. Gear —36— is keyed to the screw feed shaft —37, and also meshes into gear —38—, which is keyed to the main shaft —2— and rotates continuously with said shaft. Rocker —40— is hinged on top of slide —35—, and carries at the outer end a vertical slide —41— which engages in the threads of feed screw —37.

In order to turn the automobile to any desired position, the driver of the automobile pulls the rod —39—, as indicated by the arrow, the end of which is connected to the rocker —40, disengaging the slide —41— from the feed screw and allowing the whole frame —35— to slide back on the supporting slides —42. When released, —41— again engages the threads of the feed screw —37. The distance the slide is pulled back will determine the distance the automobile is to turn before the device is tripped and thrown out of gear. Then by pressing the foot pedal —44, the connecting rod pushes the eccentric arm —18— forward, engaging gear —16— with the gear on motor crank shaft, furnishing power to operate the device.

As slide —35— is drawn back by the rod —39—, in the direction as indicated by the arrow, the rocker —34— is allowed to rise, thus releasing the tension on the heavy coil spring —33, and allowing spring —32— to draw rocker —31 down, turning shaft —30— and rocker —14— forward, thus moving ratchet collar —13— so as to engage in the corresponding ratchet on bevel gear —4, and throwing the device in gear whereby the slide —12— with the carrying wheel —19 is lowered to the ground, thus raising the front end of the automobile; also bringing gears —21 and 28 into mesh, giving motion to the carrying wheel —19— and swinging the automobile in place. Screw feed shaft —37 rotating continuously with the main shaft —2, thus draws slide —35— back to its original position. As slide —35— comes in contact with the rocker —34, pushing it forward, it stretches the heavy coil spring —33. At the end of rocker 31 is a supporting spring —43— fastened to the side wall of the casing, and hooks under rocker arm 31— when that arm is raised by the light coil spring —32—, thus prevents its being pulled down, as the tension is again put into the heavy coil —33—, by rocker —34 when pressed forward. When slide —35— reaches the extreme position, as shown in Fig. 3, it pushes the support spring —43— from under rocker arm —31—, and the coil spring —33— draws the arm downward, turning shaft 30— and rocker —14— backward, engaging the ratchet collar —13 into the bevel gear —3—, throwing the device in gear, and reversing gears —5—7—8—9, thus raising the slide —12 and wheel 19, also disengaging gears —21 and 28, thereby stopping the motion of the carrying wheel —19.

As slide —12, which carries pin —29, is raised to the position shown in Fig. 2, the said pin engages the rocker arm —14— disconnecting the ratchet collar —13— from gear —3—, throwing the whole device out of gear, and allowing the main shaft —2— to turn loosely in the casing and gears, until disconnected from the motor by releasing the foot pedal —44—, which draws arm —18— back, and disengages gears —16 and 17. This makes the complete operation and bringing the device at rest.

I do not wish to confine myself to the exact construction as herein described, but merely give this as a preferred form of construction.

Having fully described my device herein, what I claim as my invention, and desire to secure by Letters Patent is—

1. In a turning device for motor vehicles, the combination with the motor and shaft thereof, of a frame fixedly attached to the forward part of the vehicle, a sliding member vertically movable relative to the frame to raise or lower the front end of the vehicle, a rotatable carrying wheel on the slide, driving means therefor carried by the slide, a driven shaft adapted to be connected with the motor shaft, the driving means for the carrying wheel being directly connected with the driven shaft upon reaching the limit of its downward movement and automatically disconnected therefrom upon upward movement of the slide, and means for raising or lowering the slide by the said driven shaft.

2. In a device of the character described, the combination with a power-propelled vehicle, of a frame member attached to the forward part of the vehicle, a slide member vertically movable on the frame, a carrying wheel on the slide, means on the slide for driving the carrying wheel, a driven shaft adapted to be brought into and out of operation by the power of the vehicle, a worm and rack mechanism for moving the slide, means including the driven shaft for operating the worm, means for causing cessation of operation of the worm automatically operated at the limit of movement of the slide in either direction, and means automatically brought into operation on the slide reaching the limit of its downward movement operatively connecting the carrying wheel and driving means with the driven shaft.

3. A device of the character described, a supporting frame attached to the front axle of an automobile, a carrying wheel, means for operating same, supporting slide, a rack attached, a worm gear, means for operating same, a main shaft which rotates continuously in combination with a pair of loosely mounted bevel gears thereon, which are continuously meshed with the gear on the end of the work shaft, and directly connected to and operating the worm gear, a ratchet on the inner face of each loosely mounted gear, a ratchet collar splined to the main shaft and engaging either ratchet adapted to cause rotation of the gear with the shaft, means for moving ratchet collar longitudinally on said shaft, and means actuated by the motor for causing the rotation of the main shaft.

4. A device of the character described, a supporting frame attached to the front axle of an automobile, a carrying wheel, means for operating same, a supporting slide, a rack, a worm gear and means for operating same, a main shaft with a pair of loosely mounted gears thereon, which are continuously in mesh with gear on the end of the work shaft and directly connected with the worm gear, means for engaging either one of said loosely mounted gears with the main shaft, means for turning said main shaft in combination with an idler gear on a hinged frame and mounted on an eccentric bearing, an arm for turning eccentric bearing and bringing idler in contact with gear on motor shaft, a connecting rod and foot pedal to operate eccentric lever.

5. A device of the character described comprising a supporting frame fixedly attached to the front axle of a power propelled vehicle, a slide member vertically movable in the said frame, a carrying wheel supported by the slide, means for moving the slide vertically in the frame, manual means connecting said movable means with the power of the vehicle to drive the same, manual means for starting operation of the slide, automatic means for disengaging the slide with the propelling means limiting the extent of movement thereof in either direction, a gear on the said slide, means connected therewith for rotating the carrying wheel, means for rotating said gear when the slide reaches the limit of its lifting movement, and means limiting the extent of rotation of the carrying wheel.

6. A device of the character described, a supporting frame attached to the front axle of an automobile, a carrying wheel, a supporting slide, means for operating said wheel and slide, a controlling device in combination with a feed screw shaft connected directly with the main shaft, means actuated by the motor causing the rotation thereof, a sliding frame, a rocker mounted on said frame with slide to engage said feed screw, and means for controlling said rocker, slide and frame.

7. A device of the character described, a supporting frame attached to the front axle of an automobile, a carrying wheel with a supporting slide, means for operating said slide and carrying wheel, a controlling device in the combination of a screw feed shaft, means for gearing to main shaft, means actuated by the rotation of the motor for continuously turning said feed screw, a pair of slides, a frame supported on said slides, a rocker mounted on said frame, a slide attached thereto and engaging the threads of the aforesaid feed screw, and means for operating said rocker, slide and frame, a secondary rocker engaging the side of said frame for stretching heavy coil spring, a double rocker arm carried by a supporting shaft and controlled by coil springs attached thereto, means for controlling said double rocker, an arm connected to said supporting shaft engaging and controlling the ratchet collar, which is splined to the main shaft, thus controlling the movement of the main drive gear, a trip lever on the side of the supporting shaft, and trip pins in the main slide supporting the carrying wheel for operating said trip arm.

8. In a device of the character described, a carrying wheel supported on the forward axle adapted to be raised or lowered, means including the power apparatus of the vehicle for raising or lowering the wheel, automatic means limiting the extent of movement of the wheel, means brought into operation when the wheel has reached its lowermost position adapted to cause rotation of the carrying wheel, and means for variably limiting the extent of rotation of the carrying wheel.

9. In a device of the character described the combination with a power-propelled vehicle, of a carrying wheel supported on the forward axle and adapted to be raised or lowered, means including the power apparatus of the vehicle for raising or lowering the wheel, automatic means limiting the extent of movement of the wheel in either direction, means brought into operation when the wheel has reached its lowermost position causing rotation of the carrying wheel, means for variably limiting the extent of rotation of the carrying wheel, and means for automatically raising the carrying wheel at completion of its predetermined extent of revolution.

10. In a device of the character described the combination with a power propelled vehicle, of a carrying wheel supported on the forward axle adapted to be raised or lowered, means including the power apparatus of the vehicle for raising or lowering the said wheel, manual means for setting the mechanism to lower the wheel, automatically operated means for rotating the wheel to a predetermined extent when it reaches its lowermost position and finally raising the wheel to original position, and means for limiting the extent of vertical movement of the wheel in either direction.

11. In a device of the character described the combination with a power propelled vehicle, of a carrying wheel supported on the forward axle and adapted to be raised or lowered, means including the power apparatus of the vehicle for raising or lowering the wheel, manual means for setting the mechanism to lower the said wheel and raise the front end of the vehicle from the ground, means limiting the extent of vertical movement of the wheel, means brought into operation at the completion of the downward movement of the wheel causing rotation thereof, trip mechanism adapted to be set previous to operation of the said manual means whereby the extent of rotation of the carrying wheel may be predetermined, said trip being adapted at the completion of the predetermined rotation of the carrying wheel to set the mechanism to raise the wheel to original position and lower the front end of the vehicle into contact with the ground.

12. In a device of the character described the combination with a power-propelled vehicle, of a carrying wheel supported on the forward axle and adapted to be raised or lowered, means including the power apparatus of the vehicle for raising or lowering the said carrying wheel, manual means for starting the mechanism and lower the wheel to position to raise the front end of the vehicle from the ground, means whereby the wheel is rotated on completion of downward movement, trip mechanism adapted to be set previous to operation of the device to predetermine the extent of rotation of the carrying wheel, the mechanism being adapted to be variably set whereby the extent of rotation may be variably determined, said trip mechanism being automatic in operation and adapted at the completion of the predetermined rotation of the carrying wheel to reset the mechanism to raise the wheel to original position and lower the front end of the vehicle to contact with the ground.

13. A device of the character described comprising the combination with a power-operated vehicle, of a frame member fixedly attached to the front axle of the vehicle, a carrying wheel vertically movable relative to the frame to raise or lower the front end of the vehicle, means actuated by the vehicle motor for moving the wheel, manual means for connecting the mechanism with the motor, the mechanism being automatic in character and operating to first lower the wheel to a predetermined extent and finally return the wheel to original position.

14. In a device of the character described the combination with a power-propelled vehicle, of a supporting frame carried by the front axle, a carrying wheel vertically movable relative thereto, mechanism adapted to be actuated by the vehicle motor for vertically moving the wheel, manual means for starting the operation of the said actuating means, means limiting the extent of vertical movement of the carrying wheel in either direction, the mechanism being adapted to move the carrying wheel downward to the limited extent to raise the vehicle from the ground, and mechanism adapted to be manually set to automatically cause rotation of the carrying wheel at completion of its downward movement and return the carrying wheel to original position upon completion of its rotation, the possible setting of the said mechanism ranging from that in which no rotation of the wheel is produced to that in which the wheel is rotated to an extent to turn the vehicle on the driving wheels as a pivot to face in an opposite direction.

In testimony whereof I, MYRON J. DIKEMAN, sign this specification.

MYRON J. DIKEMAN.

Witnesses:
WM. P. DIES,
WILLIAM GICHBAUM.

Copies of this patent may be obtained for five cents each, by addressing the "Commissioner of Patents, Washington, D. C."